United States Patent [19]
Roskowski et al.

[11] Patent Number: 5,694,545
[45] Date of Patent: Dec. 2, 1997

[54] SYSTEM FOR PROVIDING CONTROL OF DATA TRANSMISSION BY DESTINATION NODE USING STREAM VALUES TRANSMITTED FROM PLURAL SOURCE NODES

[75] Inventors: Steven G. Roskowski, Sunnyvale; Dean M. Drako, Cupertino; William T. Krein, San Jose, all of Calif.

[73] Assignee: Apple Computer, Inc., Cupertino, Calif.

[21] Appl. No.: 483,831

[22] Filed: Jun. 7, 1995

Related U.S. Application Data

[63] Continuation of Ser. No. 275,812, Jul. 15, 1994, abandoned, which is a continuation of Ser. No. 815,816, Dec. 30, 1991, abandoned.

[51] Int. Cl.$^6$ .................................................. G06F 13/362
[52] U.S. Cl. ............................. 395/200.06; 395/729
[58] Field of Search .................... 395/375, 200.06, 395/800, 650, 289, 467, 729

[56] References Cited

U.S. PATENT DOCUMENTS

| | | | |
|---|---|---|---|
| 3,109,162 | 10/1963 | Wolensky | 395/425 |
| 4,276,611 | 6/1981 | Jansen | 395/325 |
| 4,402,040 | 8/1983 | Evett | 395/325 |
| 4,413,258 | 11/1983 | Quick, Jr. et al. | 340/825.5 |
| 4,423,480 | 12/1983 | Bauer et al. | 395/325 |
| 4,525,849 | 7/1985 | Wolf | 375/118 |
| 4,527,233 | 7/1985 | Ambrosius, III et al. | 395/250 |
| 4,620,278 | 10/1986 | Ellsworth | 395/325 |
| 4,621,342 | 11/1986 | Capizzi et al. | 395/325 |
| 4,672,536 | 6/1987 | Giroir et al. | 395/725 |
| 4,683,534 | 7/1987 | Tietjen et al. | 395/325 |
| 4,766,536 | 8/1988 | Wilson, Jr. et al. | 395/325 |
| 4,766,538 | 8/1988 | Miyoshi | 395/325 |
| 4,837,682 | 6/1989 | Culler | 395/325 |
| 4,864,496 | 9/1989 | Triolo et al. | 395/325 |
| 4,920,486 | 4/1990 | Nielsen | 395/325 |
| 4,924,380 | 5/1990 | McKinney et al. | 395/325 |
| 4,937,733 | 6/1990 | Gillett, Jr. et al. | 395/325 |
| 4,953,081 | 8/1990 | Feal et al. | 395/325 |
| 4,956,771 | 9/1990 | Neustaedter | 395/650 |
| 4,965,723 | 10/1990 | Kirk et al. | 395/325 |
| 5,081,576 | 1/1992 | Ward | 395/289 |
| 5,088,024 | 2/1992 | Vernon et al. | 395/725 |
| 5,097,437 | 3/1992 | Larson | 395/775 |

(List continued on next page.)

FOREIGN PATENT DOCUMENTS

| | | |
|---|---|---|
| 0038189 | 10/1981 | European Pat. Off. . |
| 0127007 | 12/1984 | European Pat. Off. . |
| 0141742 | 5/1985 | European Pat. Off. . |
| 0240749 | 10/1987 | European Pat. Off. . |
| 63-094358 | 9/1988 | Japan . |
| 1 246664 | 10/1989 | Japan . |
| HEI 1-246664 | 10/1989 | Japan . |
| 02-294755 | 2/1991 | Japan . |
| 2256563 | 12/1992 | United Kingdom . |

OTHER PUBLICATIONS

"The ZMODEM Inter Application File Transfer Protocol" Author: Forsberg, Mar. 29, 1988.

Choudhary et al, "A Modified Priority Based Probe Algorithm for Distributed Deadlock Detection and Resolution", IEEE, vol. 15, No. 1, Jan. 1989, pp. 10–17.

*Primary Examiner*—Richard L. Ellis
*Assistant Examiner*—Gautam R. Patel
*Attorney, Agent, or Firm*—Blakely, Sokoloff, Taylor & Zafman

[57] ABSTRACT

Apparatus for allowing a component of a computer system to which data is to be written to control the order of transfer of that data including circuitry for providing a numbered signal signifying that a particular component has a set of data which is to be transferred to the destination component, circuitry associated with the destination component for choosing among all of the numbered signals to select from all sets of data a next set of data in a particular numerical order, and circuitry associated with the destination component for selecting other than the next set of data in the particular numerical order.

13 Claims, 5 Drawing Sheets

U.S. PATENT DOCUMENTS

| | | | |
|---|---|---|---|
| 5,111,424 | 5/1992 | Donaldson et al. | 395/725 |
| 5,113,369 | 5/1992 | Kinoshita | 395/325 |
| 5,151,994 | 9/1992 | Wille et al. | 395/800 |
| 5,167,019 | 11/1992 | Fava et al. | 395/200 |
| 5,179,557 | 1/1993 | Kudo | 370/94.1 |
| 5,191,653 | 3/1993 | Banks et al. | 395/275 |
| 5,193,149 | 3/1993 | Awiszio et al. | 395/200 |
| 5,193,197 | 3/1993 | Thacker | 395/725 |
| 5,218,676 | 6/1993 | Ben-Ayed et al. | 395/200 |
| 5,220,653 | 6/1993 | Miro | 395/275 |
| 5,222,223 | 6/1993 | Webb, Jr. et al. | 395/467 |
| 5,265,215 | 11/1993 | Fukuda et al. | 395/325 |
| 5,517,622 | 5/1996 | Ivanoff et al. | 395/200.13 |

SYSTEM FOR PROVIDING CONTROL OF DATA TRANSMISSION BY DESTINATION NODE USING STREAM VALUES TRANSMITTED FROM PLURAL SOURCE NODES

This is a continuation of application Ser. No. 08/275,812, filed Jul. 15, 1994 now abandoned, which is a continuation of application Ser. No. 07/815,816, filed Dec. 30, 1991 now abandoned.

BACKGROUND OF THE INVENTION

1. Field of the Invention

This invention relates to computer interconnects and, more particularly, to methods and apparatus for allowing destination components of a computer to exercise control over the flow of information in order to speed the operation of a computer system with which the interconnect is used.

2. History of the Prior Art

Computer systems usually employ busing arrangements to transfer information between the individual components of the system. Such busing arrangements are capable of handling data from a single source component at a time. Consequently, such busing arrangements include some means for deciding which data is to be transferred first. Such means for deciding are referred to as arbitration circuits. When a source component desires to write data to some other destination component, it signals that the data is ready and provides an address to which the data is to be written. If more than one source component has data to transfer, the arbitration circuitry decides from which source to transfer data first. This determination is often based on some sort of criteria such as which source component is sending the data. The arbitration circuit looks at all of the various sources of data available for transfer in the system and selects one source to transfer data based on the particular criteria.

U.S. patent application Ser. No. 07/816,346, entitled INTERCONNECT SYSTEM ARCHITECTURE, Roskowski et al, filed Dec. 30, 1991 now abandoned, and assigned to the assignee of the present invention, discloses a high speed interconnect for a computer system which allows a plurality of data sources to transfer a very large amount of data to a plurality of destinations concurrently. While the typical computer system utilizes a busing arrangement as the interconnection to transfer data from one component of the system to another, the requirements for pathways to handle more and more information faster have increased to the point that various functions cannot be performed by such an arrangement. Functions such as the presentation of animated graphics and television require the transfer of so much data that the entire busing arrangement must be devoted to their use. When it is desired to incorporate a number of these functions into the same computer system and to run more than one of these operations at a time, a typical busing arrangement is incapable of supporting the required bandwidth.

The interconnect of the above-mentioned patent application includes a plurality of nodes each of which is capable of joining to a component of a computer. Each node comprises apparatus for transferring signals between the component and the node. This apparatus includes circuitry for automatically translating between data formats. Each node also includes circuitry for storing a plurality of multiword packets of data from the associated component. Circuitry is also provided at each node for signalling each other node that a packet of data exists for transfer to the component associated with that node and for sensing signals from another node indicating that a packet of data exists for transfer to the component associated with that node. Finally, each node is connected to each other node by circuitry for transferring packets of data stored at one node to another node.

This interconnect essentially provides a plurality of individual paths which may simultaneously transfer data between each of the components of a computer system and between each of those components and any system peripherals connected by means of the interconnect. The interconnect disclosed in the above-mentioned patent application operates very rapidly to transfer data between components. This occurs, in part, because simultaneous transfers of data between components may occur and because such data is transferred in packets, reducing the overhead associated with individual word transfers. The transfer in packets also allows a source of data to load a packet of data at a node storage buffer, signal the destination component that the information is available, and go on to some other task. As an example of its speed, a simple interconnect connecting four components of a computer system is capable of transferring four times as much data as can the most advanced busing arrangements.

Transferring data in packets, however, means that the time required for individual transfers is usually longer than the time required for transfer of single words as in an ordinary busing system. Since these transfers take a longer time, conflicts between data are more likely. Consequently, arbitration arrangements for determining which data is next to be transferred are especially important to such a system.

One method for determining the source to choose for data to be transferred depends upon the priority assigned to the data by the source of the data. U.S. Pat. No. 5,257,385, entitled APPARATUS FOR PROVIDING PRIORITY ARBITRATION IN A COMPUTER SYSTEM INTERCONNECT, Roskowski et al, issued Oct. 26, 1993, and assigned to the assignee of the present invention, discloses priority arbitration circuitry which may be used in the high speed interconnect mentioned above. However, it is often the case that the use of certain data by a component of a computer system depends upon the availability of other data from another component of the system. This is particularly true in more advanced computer systems which are capable of presenting or utilizing information from a number of sources simultaneously. For example, if a computer display is to present a video image such as a television picture in a window on its output display at the same time it is presenting background information related to another computer program on the same display, the video information will probably be furnished by one source while the information determining where and how the video information is to be displayed will be furnished by a window control program being run on the central processor of the computer system. Thus, the use of the video data from a first source depends upon the availability of positioning data from a second source. Such data interrelations are called data dependencies.

It may be the case in an arbitration circuit where sources assign priority and where data dependencies are involved that data of a high priority is selected by the arbitration circuit while data of a lower priority is needed by the destination component. Since the priority arbitration circuitry determines the data to be transferred based on source determinations of priority, this situation can cause a system deadlock in which the operation cannot be carried out. Such a deadlock would be resolved in a conventional busing arrangement by the generation of error signals which would cause the system to throw out the existing arbitration requests and begin over again. Such a deadlock at the very least would drastically slow the operation of the system and at the worst would cause the system to cease operating.

Since, as explained above, in a system where the priority of transfer for data write operations is determined by the source of the data, system deadlocks are quite possible where data dependencies exist. This is especially true because the system is specifically designed for multimedia use with data available from a plurality of sources simultaneously. It is, therefore, quite useful to devise an arrangement for curing the problem of system deadlock for this high speed interconnect as well as for other interconnecting arrangements including conventional buses.

SUMMARY OF THE INVENTION

It is, therefore, an object of the present invention to eliminate the problem of system deadlocks caused by data dependencies in a computer system.

It is another more specific object of the present invention to provide apparatus for allowing a destination component of a computer system to determine which data is to be written to it.

These and other objects of the present invention are realized in an arrangement for allowing a first component of a computer system to which data is to be written to control the order of transfer of that data comprising means for providing a numbered signal signifying that a particular component has a set of data which is to be transferred to the first component, means associated with the first component for choosing among all of the numbered signals to select from all sets of data a next set of data in a particular numerical order, and means associated with the first component for selecting other than the next set of data in the particular numerical order.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
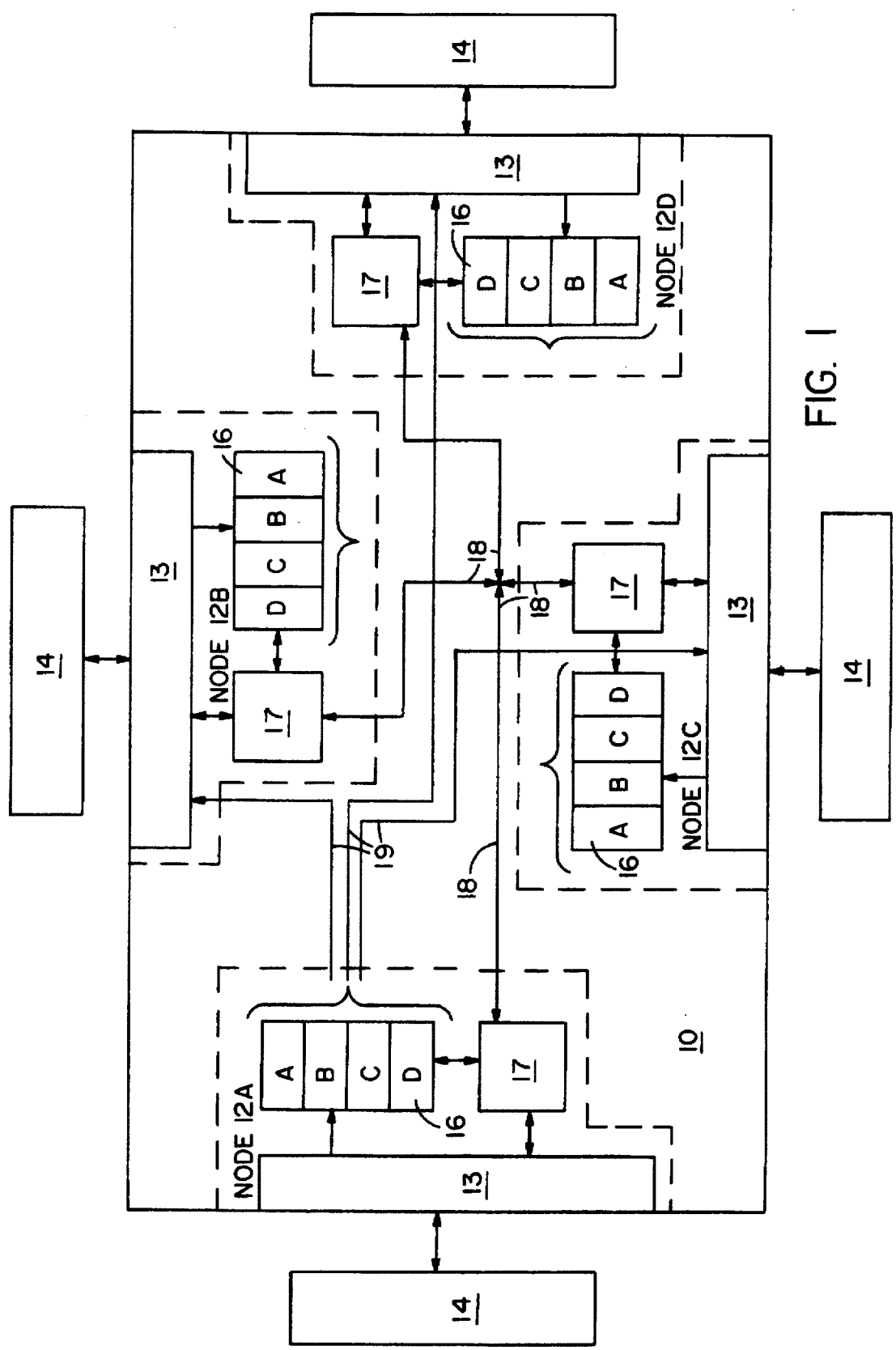
FIG. 1 is a block diagram of a high speed interconnect which may utilize the present invention.

Referring now to FIG. 1, there is illustrated an interconnect 10 designed in accordance with the first above-mentioned patent application. The interconnect 10 illustrated includes four nodes 12 each of which nodes may be connected by an interface 13 to a computer system component or peripheral 14. Each node 12 includes circuitry 16 for receiving and storing data from the associated component 14 in a plurality of packets. In the embodiment illustrated, four individual storage areas for storing packets are illustrated; these storage areas are individually referred to by the letters A, B, C, and D in the figure. In the interconnect 10 designed in accordance with the above-mentioned patent application, each packet may comprise up to sixty-four bytes of data.

Also included at each node 12 is control circuitry 17 which is adapted to utilize information provided by the components 14 to control the transfer of the data at any node 12 to a component 14 connected to any other node 12. The control circuitry 17 of each node 12 is connected to transfer control information to the control circuitry 17 of each other node by a launch bus or buses 18. In the preferred embodiment of the interconnect, an individual launch bus 18 connects each node 12 to each other node 12.

The manner in which this information is transferred is by means of a so-called header. A header is data generated by the source component 14 which is transferred by the interface 13 to the control circuitry 17 when each packet of data is sent by the interface 13 to storage in circuitry 16 at the source node 12. A header includes the address of the node to which data is to be sent, the source-determined priority of the data or a "stream number" (discussed below) where priority is to be determined at the destination component, and the type of operation to be accomplished. This header is sent on the launch bus 18 by the control circuitry 17 of the source node 12 to the control circuitry 17 at the node of the addressed component. Usually the order of use of data from all sources is determined by the control circuitry 17 of the destination node 12 using the priority information furnished by the source components in accordance with the teaching of the second above-mentioned copending patent application. The circuitry for controlling the priority arbitration of the order of use is included within the control circuitry 17 illustrated in FIG. 1 and may be considered to be part of each destination node 12.

Once the data to be transferred is determined, the packets of data held in the storage circuitry 16 at each source node 12 are transferred from the circuitry 16 under control of the control circuitry 17 by directly-connected data paths 19 to the interface 13 of each other node. Only one set of directly-connected data paths 19 is illustrated in FIG. 1 (the connections from the node 12 at the left of the figure) in order not to complicate the drawing.

Since the order of use of data is normally determined by priority information furnished by the sources of the data, the system is subject to deadlocks where data dependencies exist. The present invention is directed to eliminating those deadlocks through the provision of an arbitration system which allows a component to which information is to be transferred to determine the order in which that information is transferred. This is accomplished by providing a second method of arbitration called "stream arbitration" in which packets of information belonging to "streams" are labelled with "stream numbers" so that they may be selected for transfer under control of a destination component.

One element of the present invention which cooperates in eliminating deadlocks is the use of a "stream full signal." A deadlock can occur at a source node because of the limited amount of storage available for incoming data. If the buffers of this storage circuitry 16 are filled with data having a particular stream number, there is no way to provide other data from other streams to the storage area. Consequently, there is no way to inform the destination component that data of other stream numbers exists. To obviate this deadlock, the stream full signal is provided. If the source node 12 holds data having a particular stream number in its source buffer circuitry 16 as indicated in the header for the packet of data, the stream full signal is used to advise the source component 14 of the fact. A protocol to which a source component should adhere advises against sending another packet of the same stream number to another source buffer of the circuitry 16 when the stream full signal is received. The generation of the stream full signal is accomplished by comparing the header of each new packet with the headers for packets already in the storage buffer area when the new header is asserted. The stream number and node address of each new packet are compared to the stream number and node address of each packet already stored. If the same stream number and node address are contained in any data packet held in the storage buffers at that node, the node returns a stream full signal. This stream full signal indicates to the source component that it should cease transmitting the data of that stream number destined for that node to the storage buffer area until the stream full signal is removed.

Figure 3:
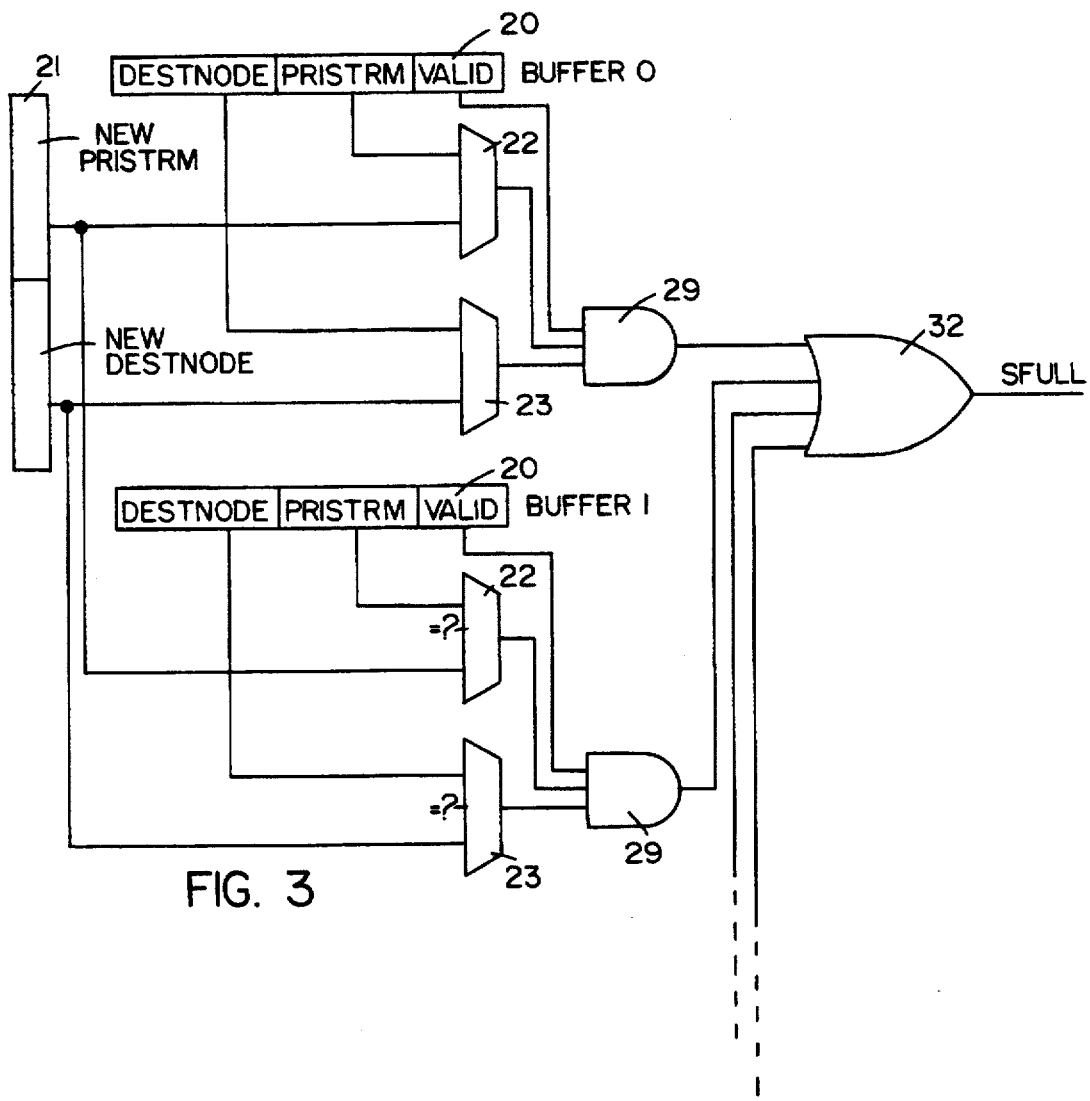
FIG. 3 is a block diagram of circuitry illustrating a particular element of the circuitry described in FIG. 1 of the present invention.

To accomplish this, each node 12 includes within the source portion of its control circuitry 17 a set of registers 20 (see FIG. 3) which store the stream numbers of the packets included in the source buffer circuitry 16 at that node along with the number of the node to which the information is directed. A comparator 22 compares the stream number in the header of the incoming data packet at the header buffer 21 with the values of stream numbers in the registers 20. At the same time, a comparator 23 compares the node to which the incoming signal is directed with the node to which each packet stored at the node is directed. If both comparators produce a positive comparison signal and if the packet is valid, an AND gate 29 passes a signal to an OR gate 32 which generates a stream full signal. The valid bit serves to indicate that there is a packet loaded in the associated buffer and ready to be launched. Thus, if any of the stream numbers in the registers 20 match those in the header asserted, a stream full signal is asserted to indicate that the incoming packet should not be loaded and its acceptance should be retried at a later time. The preferred embodiment includes a circuit such as is shown in FIG. 3 at each node for generating stream full signals.

The stream full signal eliminates the deadlock created by the filling of buffers at a node 12 connected to a source component 14 where the buffers already have stored information of the same stream number which must be used before the later arriving information may be used. In this manner, a substantial amount of data of one stream number is not allowed to build up in the limited buffer storage area of circuitry 16 provided at a source node so that it precludes other streams of information from reaching the buffer storage.

Figure 2:
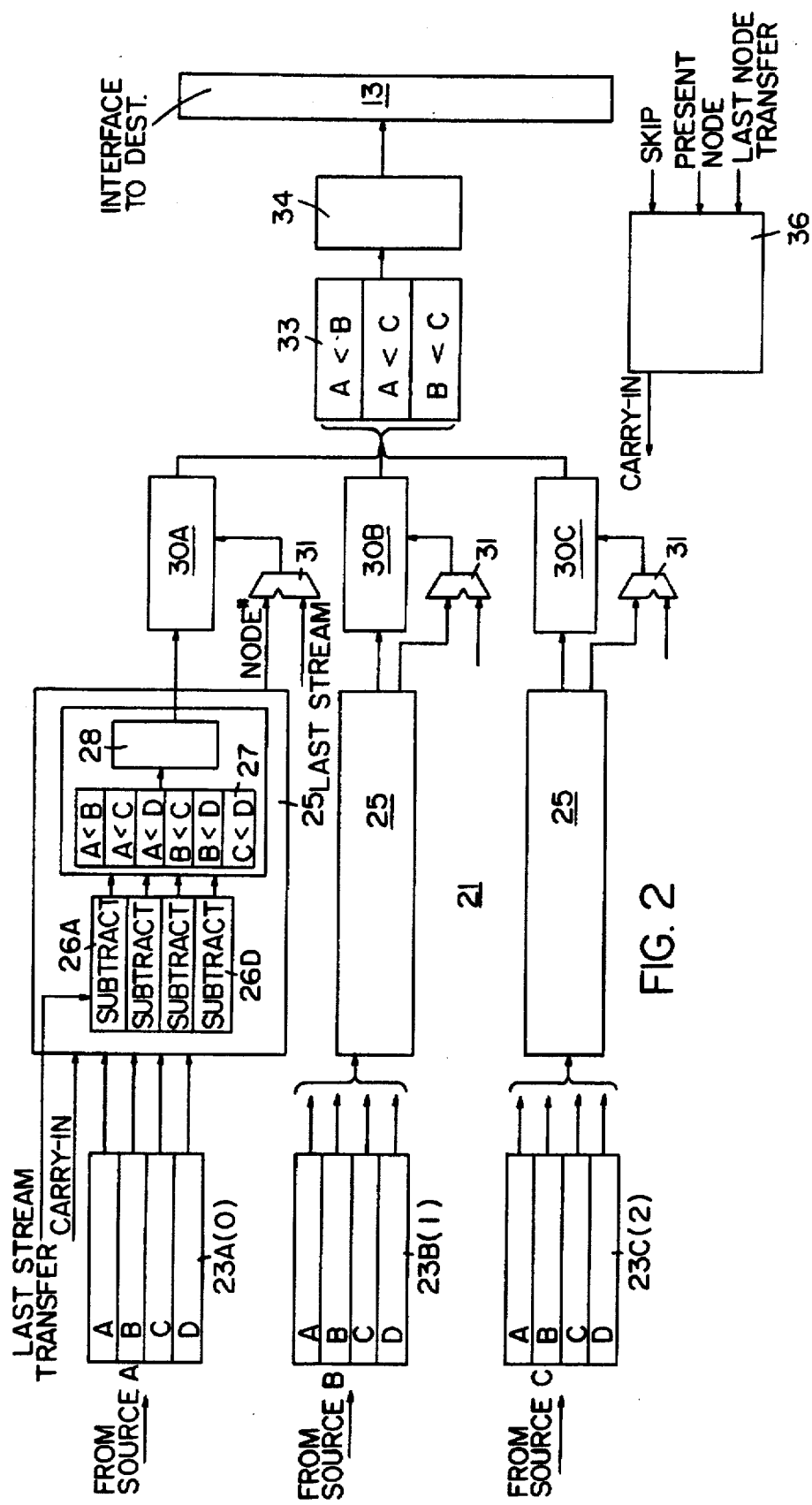
FIG. 2 is a block diagram illustrating the circuitry of the present invention.

A second element of the invention which cooperates to eliminate system deadlocks is the stream arbitration circuitry 21 illustrated in FIG. 2. The circuitry 21 of FIG. 2 is positioned in the destination control circuitry 17. It reviews all of the header information regarding streams available at all of the source nodes of the interconnect 10 and determines which should be chosen next. It does this by going through each of the streams beginning at the last stream transferred and determining first whether additional data of that stream number is available at any node. It then proceeds to the next highest stream number and determines whether data of that stream number is available at any of the nodes. Thus, the sequence is to proceed first through nodes and then through streams in order.

For example, if at destination node D stream 0 was last transferred from source node A, the stream arbitration circuitry 21 looks to node B to determine if stream 0 data exist at that node. If not, it looks to node C for stream 0 data. If no stream 0 data exists at node C, the circuitry 21 looks for the next highest stream number and searches the nodes in the same order to determine if other data of that stream number exists. The circuitry 21 continues in this manner until the next stream of information is found. At this point, that next stream is selected; and its stream number becomes the number against which each node is compared. The circuitry 21 continues in this manner until the highest stream number is reached and then reverts to the lowest stream number. Thus, it may be seen that, in fact, the normal order of processing is by a single stream number through all of the nodes in order, then to the next highest stream number through all of the nodes in order as described.

This normal order may be varied by instruction from the destination component 14 at the node which includes the stream arbitration circuitry. The component 14 advises the circuitry 21 to skip the stream which would normally be processed and proceed to the next stream in the order. Using this skip signal, the destination component may control the information to be written to it by selecting that data available which, to the destination component, is most necessary.

Moreover, the skip signal may be used in the interconnection described in the patent application first above referred to to allow the destination to pick among data which is the subject of read response operations, source-determined priority data, and streams of data. The normal priority for such data is read response operations occur first, then priority operations, then stream operations. However, a skip signal coming from a destination component allows read response operations to be skipped one at a time, all priorities to be skipped at once, and streams to be skipped one at a time. In this manner, a destination component may select the particular information it desires to utilize and eliminate system deadlocks based on data dependencies.

FIG. 2 illustrates the circuitry 21 of the present invention at any single destination node 12. The circuitry 21 at each destination node (node D is illustrated) includes sets of registers 23 for storing header information which describes the packets of data stored at the source buffer circuitry 16 of each other node 12. Three sets of registers 23A, 23B, and 23C are illustrated for storing header information for each of the individual packets of data which may be stored at each of the source nodes 12. Each register A–D of each register set 23A–C is associated with a particular one of the storage buffers of the circuitry 16 at a particular node 12. Thus, the upper (in the figure) set of registers 23A stores information regarding the packets of data in storage buffers A–D at node A. The middle set of registers 23B stores information regarding the packets of data in storage buffers A–D at node B. The lowest set of registers 23C stores information regarding the packets of data in storage buffers A–D at node C.

For the purpose of this invention, although all of the header information is stored in the registers 23 of the interconnect of the above-mentioned patent application, only the information stored defining a stream number for the particular packet of data at the source node 12 will be referred to hereinafter. In the preferred embodiment of the invention, a total of eight stream numbers (which are herein designated as levels 0–7) are utilized. In one embodiment of the invention, the same bits of header information may be used to indicate either a priority determined by the source component or a stream number used as described hereinafter to determine order of use by the destination component. In this embodiment, either source or destination selection is determined by the condition of one bit of information in the four bits available to designate the order of use. For the remainder of this description, unless mentioned otherwise, it will be considered that the bit causing this selection is set to the condition in which the other three of the four bits indicate a stream number.

For each set of registers 23 related to one of the source nodes, the bits of each header signifying the stream number of the data packet are transferred to a circuit 25 at which a determination is made of the next stream number available at that source node. To accomplish this, the bits of each header indicating the stream number are transferred to a subtractor circuit 26 A–D associated with that particular header. Also transferred to each subtractor circuit 26 is the stream number of the last transferred packet of data. The stream number of the last transferred packet of data is subtracted from the stream number of the header to provide a binary number which is a binary count signifying how far the stream numbers are apart. The value produced by each subtractor circuit 26 is furnished to a comparator circuit 27. The comparator circuit 27 may comprise a series of individual comparators which compare simultaneously each subtractor result to each other result. In a preferred embodiment including six such comparators in a circuit 27, the result from the upper (in the figure) subtractor circuit 26 is compared to the result from each of the other subtractor circuits 26, the result from the second subtractor circuit is compared to the result from the third and fourth subtractor circuits 26, and the result from the third subtractor circuit 26 compared to the result from the fourth subtractor circuit 26.

These six values are furnished to a logic circuit 28 which uses the output furnished by the individual comparators of the circuit 27 to select the numerically smallest output of the subtractors. This lowest difference value indicates the next stream number in order available at the source node.

It should be noted that a tie can never occur because the system stream protocol using the stream full signal allows only a single packet from any one stream to reside at a source node, and the source hardware will not send a second packet from the same stream from a single node until the transfer of the first packet has been completed. An arrangement for assuring that this occurs is disclosed in copending patent application entitled, APPARATUS FOR MAINTAINING ORDER AND ACCOMPLISHING PRIORITY PROMOTION IN A COMPUTER INTERCONNECT, Roskowski et al, Ser. No. 07/815,694, filed on even date herewith, and assigned to the assignee of the present invention.

The lowest difference value from each source node is furnished to a combining circuit 30 A–C associated with that node. The combining circuit 30 combines the three bits indicating the lowest difference value from the associated circuit 28 with the result produced by a subtractor circuit 31. The subtractor circuit 31 receives a two bit indication of the particular node producing the difference value and subtracts from it the value indicating the node of the last transmitted stream. Thus, the result of this subtraction is a binary value indicating the distance between the node of the last transmitted stream and the node producing the stream value difference. The combining circuit 30 provides an output of five bits with the most significant three bits signifying the lowest stream difference for the associated node and the least significant two bits signifying the difference between the node of the last transmitted stream and the associated node.

The three signals designating the closest stream value at each node and the difference between the node of the last transmitted stream and the associated node are transferred to a comparator circuit 33 which compares each of the values against the other two. The results of these comparisons are provided to a logic circuit 34 which uses the output furnished by the individual comparators of the circuit 33 to select the numerically smallest output. Since the highest order bits signify the least difference in stream numbers, the closest stream to the last transferred stream is first chosen. If any nodes include a stream of the same number, then this least difference value will be the same for each node. However, the lowest two bits will always differ since they indicate the relative closeness of the particular node to the last node which transferred data. Thus, where each node has data of the same closest stream number, the node closest to the last node to transfer data will be chosen. Consequently, the circuit provides an output signal which produces streams to be selected in a sequence proceeding first through nodes with a single stream and then through streams in order as desired.

In order to allow the destination component to select among data available at a plurality of sources of data, the skip signal is provided. This signal is generated by a destination component 14 when it desires to take data out of the normal order determined by the circuit 21. The skip signal is transferred from the component 14 through the interface 13 to the circuit 21 and causes the circuit 21 to skip the next stream in order and proceed to the stream next after that stream. Using this skip signal, a destination component 14 may skip to a desired source of data from an undesired source and thereby eliminate the data dependency deadlocks found in most system interconnects. In a case in which a destination component needs information from multiple streams in order to carry out an operation, this arrangement allows a deadlock to be eliminated by skipping one of the streams in order to get to another desired stream. As is pointed out above, the skip signal may be used as well to skip over read response operations and source-determined priority operations to allow the complete elimination of deadlocks. The details of accomplishing such an operation are discussed below with respect to FIG. 5.

Since the rotation from stream to stream proceeds first through each node to determine whether the same stream exists at each succeeding node, and then to the next highest stream number through each of the nodes, the skip signal affects the circuitry differently depending on the node from which the last signal was transferred. For example, if the last stream transferred was stream 1 at node A (designated by bits equal to 0), the next valid stream from node A is stream 2. However, for nodes B (designated by bits equal to 1) and C (designated by bits equal to 2), the next valid stream for transfer is stream 1 since all information of one stream is taken from all nodes. However, if the last stream transferred was stream 1 at node B, the next valid stream for transfer from node B is stream 2, from node C is stream 1, and from node A is stream 2. Consequently, the effect of the skip signal must be different depending on which node last transferred a data packet.

This is accomplished by a logic circuit 36 which receives both the value of the last node (using the number designations given above) to transfer information and the skip signal and causes either the last stream number or the last node designation number to be incremented. This incrementing may be easily accomplished by killing the carry-in value to the particular subtractor circuit 26 selected by the logic. It will be appreciated that a standard method of subtracting in logic circuits using twos complement binary numbers is to invert the number being subtracted, add it to the number from which it is being subtracted, and add back in a one (a carry). Thus, killing the carry-in has the effect of decrementing by one the value of the last transferred stream or the node from which it was last transferred depending on the selection made by the logic. Decrementing the value causes the particular packet of data to be skipped over since the indication of distance changes from nearest (0) to farthest (7).

Figure 4:
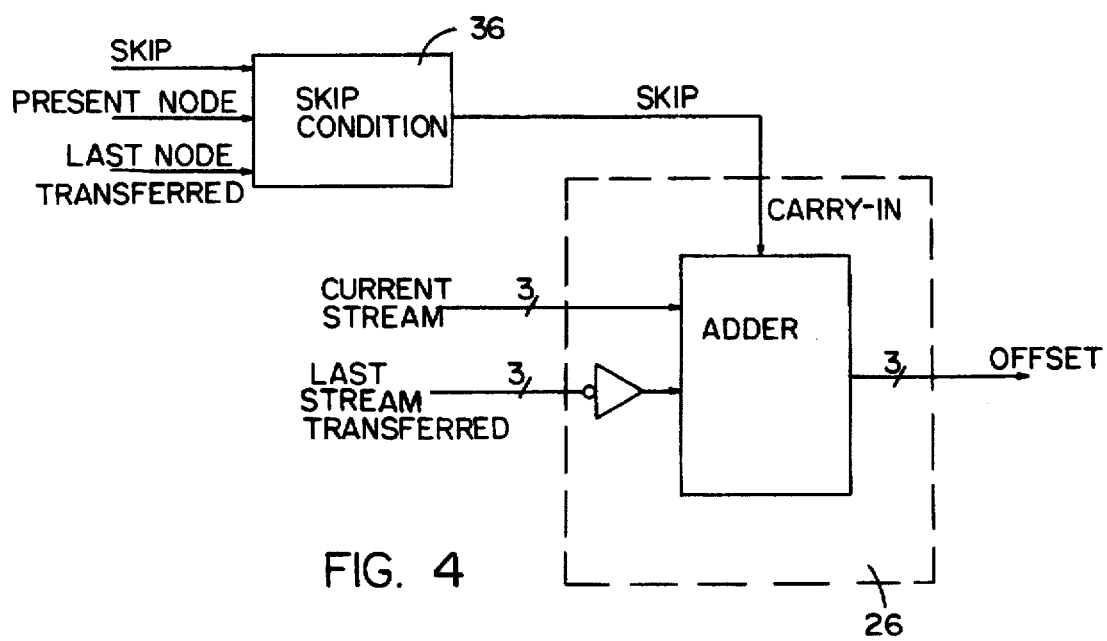
FIG. 4 is a block diagram of circuitry illustrating a particular element of the circuitry described in FIG. 2 of the present invention.

FIG. 4 illustrates an arrangement for carrying out the above-described skip operation. The circuit 36 receives the skip signal from the destination component 14. It also receives the designation value of the present node (the node being checked) and the node from which the last signal was transferred. If no skip signal is present, a carry-in signal is always transferred to the particular subtractor circuit 26 so that the difference between the current stream number and the last stream to be transferred provides the offset value to the comparison circuit 27. This is the typical manner of operation explained above.

If, however, a skip signal is present at the circuit 36 from the destination component 14, and the present node is node A, the skip signal will be transferred to eliminate the carry-in signal. If a skip signal is present from the destination component 14 and the present node is node B, the skip signal will be transferred to eliminate the carry-in signal if the last selected node was not node A. If a skip signal is present from the destination component 14 and the present node is node C, the skip signal will be transferred to eliminate the carry-in signal if the last selected node was not node A or node B. This logic produces the desired skip effect described above.

Figure 5:
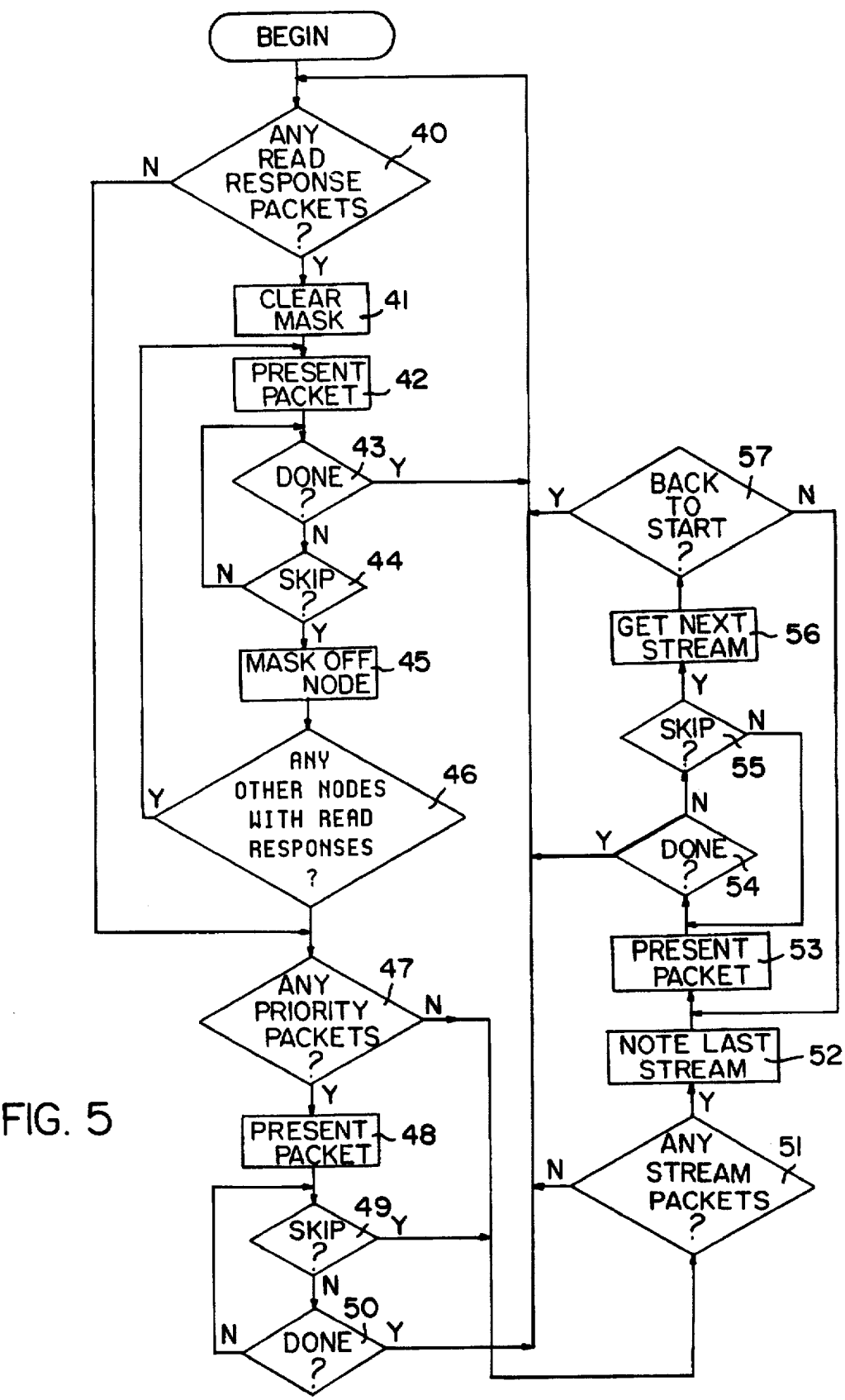
FIG. 5 is a flow chart describing the operation of a portion of the invention.

FIG. 5 is a flow chart illustrating the operation of circuitry which allows the program to skip over the read response and priority arbitration signals as well as the stream arbitration signals so that any particular signal desired by the destination component may be selected. Circuitry for accomplishing the operations of the flow chart may be easily implemented in view of the description already given for the skip operation as related to streams and from circuitry well known to those skilled in the art. In a first step 40 illustrated in the flow chart of FIG. 5, the outputs signals from three individual circuits are reviewed to determine whether a read response packet is available for transmission. The individual circuits which provide this information are the circuit illustrated in FIG. 2, a circuit for arbitrating priority responses described in the copending patent application referred to above, and a similar circuit for arbitrating read responses. A circuit for implementing the operations of FIG. 5 would be placed between the block 34 and the interface 13 of FIG. 2.

If a read response is held in any packet ready for transmission to the particular destination component as indicated by its header, a mask is cleared at step 41. This mask is an indication provided that a particular transmission is to be skipped. If no read response is presently available, the operation skips through the entire series of steps relating to read responses to a step 47 which will be discussed below. If a read response is available, at step 42 the read response packet is presented to the destination component for transfer. If the destination component accepts the read response, the read response is transferred; and at step 43 the operation determines that the operation involving the read response has been completed and recycles to step 40 to recommence the operation.

If the read response is not accepted by the destination component, the system next moves to step 44 where it is determined whether a skip indication has been received from the destination component. If a skip indication has not been received, the operation recycles to step 43. If a skip signal has been received, the operation moves to step 45 to mask off that node so that the signal is skipped. In the arrangement in which the preferred embodiment of the invention functions, only one read response is available from any node of the interconnect; consequently, masking that node effects a skip operation for the particular read response.

When the operation has completed a check for the particular read response signal and has found a skip indication, it moves to step 46 where read responses at the other nodes are reviewed in a similar manner to determine whether they are present and should be handled or skipped. If there are no more read responses at any node or if initially (step 40) there are no read responses at any node, then the operation moves to step 47 where the signals indicating available packets are reviewed to determine whether any priority arbitration packets exist, again by checking the header information available.

Priority packets are presented to the circuitry whose operation is indicated in FIG. 5 in order of priority with the highest priority packet being first. If any priority packet exists, the packet is presented to the destination component at step 48; and a determination is made at step 49 whether a skip signal exists for that packet. If no skip signal exists, the operation moves to step 50 to determine whether the destination component has accepted the packet. If the packet has been accepted, the operation recycles to step 40 to determine if new read responses have appeared and then if new priority packets are available for transmission. If the packet is not accepted, the operation recycles through the skip step until the packet is either accepted or a skip signal appears. This recycling may occur because the particular destination component is simply not ready to handle data.

If a skip occurs at step 49 all priority packets are skipped so that the order of accepting such packets remains constant.

In such a case or if no priority packets exist at step 47, the operation moves to step 51 to determine whether any stream packets are available for transmission, again by reviewing headers. If none exist, the operation recycles to step 40. If a stream is found awaiting transmission, the number of the starting stream (the last stream handled) is determined at step 52; and the new stream is presented to the destination component at step 53. At step 54, a check is made to determine whether the stream packet has been handled by the destination component. If it has, the operation recycles to step 40. If not, the operation proceeds to step 55 to determine whether a skip signal has been received. If none has been received, the operation recycles to step 54 until the particular stream header has been transmitted or a skip signal is received. In the preferred embodiment of the invention, the operation implementing the skip signal for stream packets is handled within the circuitry described in FIG. 2 in the block designated 36 in the manner described above.

If a skip signal has been received at step 55, the operation proceeds to the next stream header available at step 56. At step 57 a check is made to determine whether this new stream is the same as the starting stream noted at step 52. If it is not the same number, then the operation knows that it has not yet gone through all of the stream numbers and handles that stream signal in the same manner as the previous stream by recycling to step 53 to present the stream to the destination component for acceptance. If no additional stream signals exist as determined by the check at step 57, the operation returns to step 40.

In this manner, a destination component in the system of the present invention is capable of selecting among all of the packets available at all of the nodes of the system to determine which packet of information it desires to handle. As will be understood from the description just given, the operation checks first through all of the read responses available to determine one by one which should be transferred and which skipped. It then checks the priority packets, and, if a skips signal exist skips all such signals. Finally, the operation checks the stream packets one by one so that they may be selectively skipped.

Thus, it will be seen by those skilled in the art that the circuitry of the present invention allows a destination component to determine just which data is to be transferred to it. In this manner the circuitry provides for the elimination of deadlock conditions normal to computer systems in which data dependencies exist. Such circuitry is well adapted for use with the interconnect described in the patent application referred to above but is also applicable to other forms of interconnects including standard buses.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a computer system having a plurality of components, each with associated nodes, a method for controlling the transfer of sets of data from a plurality of source components to a destination component comprising the steps of:

assigning a stream value to each set of data to be transferred from each source component to said destination component, wherein said stream value identifies associated sets of data within the computer system;

transmitting each stream value of each set of data to be transferred to a destination node of said destination component prior to transmission of said sets of data to be transferred;

selecting for transfer in a particular order by said destination node, a next set of data from said sets of data using said transmitted stream values; and skipping said next set of data by said destination node in response to a skip signal from said destination component.

2. The method of claim 1 further comprising the steps of:

rejecting transfer of a new set of data from one of said source components to an associated source node by said associated source node when a stream value associated with said new set of data is the same as a stream value associated with any set of data to be transferred by said associated source node.

3. The method of claim 1 wherein said stream value comprises a stream number and a destination node address.

4. A computer system comprising:

a plurality of source nodes each having an associated source component, wherein each source node comprises a logic circuit configured to assign a stream value to each of a plurality of sets of data when said set of data are to be transferred within said computer system, said stream value identifying associated sets of data within said computer system, and to transmit said stream value prior to transmission of said sets of data, and a storage device coupled to said logic circuit and configured to store said stream values; and a destination node coupled to each source node and having an associated destination component, wherein said destination node comprises an arbitration circuit to review said stream values to determine a next set of data to be transferred from one of said source nodes to said destination component.

5. The computer system of claim 4 further comprising:

a control circuit coupled to at least one of said source nodes and configured to reject a particular set of data when the stream value for said particular set of data is the same as any stream value stored in said storage device.

6. The computer system of claim 4 further comprising:

a skip circuit coupled to said arbitration circuit and configured to cause said arbitration circuit to skip said next set of data in response to a skip signal from said destination component.

7. The method of claim 1 further comprising:

assigning a priority to each of a first plurality of said sets of data to be transferred from each of a first plurality of said source components; and transmitting each priority of said first plurality of said sets of data to said destination node of said destination component prior to transmission of said sets of data to be transferred.

8. The method of claim 7 wherein selecting a next set of data comprises:

selecting for transfer and in a particular order, a next set of data from said sets of data using said transmitted stream values and said transmitted priorities.

9. The method of claim 1 wherein selecting a next set of data comprises:

selecting a set of data associated with a read response operation when said sets of data to be transferred comprises said set of data associated with a read response operation;

selecting a set of data associated with a priority operation when said sets of data to be transferred comprises said set of data associated with a priority operation and when said sets of data to be transferred does not comprise said set of data associated with a read response operation;

selecting a set of data associated with a stream operation of a first stream value when said sets of data to be transferred comprises said set of data associated with a stream operation of said first stream value, when said sets of data to be transferred does not comprise said set of data associated with a read response operation and when said sets of data to be transferred does not comprise said set of data associated with a priority operation; and selecting a set of data associated with a stream operation of a second stream value when said sets of data to be transferred comprises said set of data associated with a stream operation of said second stream value, when said sets of data to be transferred does not comprise said set of data associated with a read response operation, when said sets of data to be transferred does not comprise said set of data associated with a priority operation and when said sets of data to be transferred does not comprise said set of data associated with a stream operation of said first value.

10. The method of claim 1 wherein skipping said next set of data comprises:

skipping said selected next set of data wherein said selected next set of data is associated with a read response operation from a first source component of said plurality of source components; and selecting as said next set of data, a set of data associated with a read response operation from a second source component of said plurality of source components.

11. The method of claim 1 wherein skipping said next set of data comprises:

skipping said selected next set of data wherein said selected next set of data is associated with a read response operation; and selecting as said next set of data, a set of data associated with a priority operation.

12. The method of claim 1 wherein skipping said next set of data comprises:

skipping said selected next set of data wherein said selected next set of data is associated with a priority operation; and selecting as said next set of data, a set of data associated with a stream operation.

13. The method of claim 1 wherein skipping said next set of data comprises:

skipping said selected next set of data wherein said selected next set of data is associated with a stream operation of a first stream value; and selecting as said next set of data, a set of data associated with a stream operation of a second stream value.

* * * * *